United States Patent [19]
Roberts

[11] Patent Number: 5,931,923
[45] Date of Patent: Aug. 3, 1999

[54] SYSTEM FOR ACCESSING CONTROL TO A PERIPHERAL DEVICE UTILIZING A SYNCHRONIZATION PRIMITIVE WITHIN THE PERIPHERAL DEVICE

[75] Inventor: David G. Roberts, Fremont, Calif.

[73] Assignee: Advanced Micro Devices, Inc., Sunnyvale, Calif.

[21] Appl. No.: 08/602,199

[22] Filed: Feb. 16, 1996

[51] Int. Cl.$^6$ ............................. G06F 15/16; G06F 9/06
[52] U.S. Cl. ................................. 710/36; 709/9; 709/400; 712/225
[58] Field of Search ...................... 364/238.3; 395/678, 395/226; 709/400, 9; 712/225; 710/36

[56] References Cited

U.S. PATENT DOCUMENTS

| | | | |
|---|---|---|---|
| 4,380,798 | 4/1983 | Shannon et al. | 395/729 |
| 4,435,766 | 3/1984 | Haberl et al. | 395/726 |
| 4,604,694 | 8/1986 | Hough | 395/726 |
| 4,628,445 | 12/1986 | Buonomo et al. | 395/837 |
| 4,754,398 | 6/1988 | Pribnow | 364/200 |
| 4,980,818 | 12/1990 | Shinmura | 711/147 |
| 5,361,347 | 11/1994 | Glider et al. | 395/183.2 |
| 5,394,551 | 2/1995 | Holt et al. | 395/726 |
| 5,434,970 | 7/1995 | Schiffleger | 395/200 |
| 5,485,626 | 1/1996 | Lawlor et al. | 395/650 |
| 5,586,318 | 12/1996 | Toutonghi | 395/677 |
| 5,608,893 | 3/1997 | Slingwine et al. | 395/468 |
| 5,664,092 | 9/1997 | Waites | 395/183.01 |
| 5,666,523 | 9/1997 | D'Souza | 395/570 |

FOREIGN PATENT DOCUMENTS

| | | |
|---|---|---|
| 0261497 | 9/1987 | European Pat. Off. . |
| 0645715 | 9/1994 | European Pat. Off. . |

OTHER PUBLICATIONS

IBM Technical Disclosure Bulletin, Oct. 1984, U.S., vol. 27, No. 5, "Omega–Crossbar Network".

*Primary Examiner*—Thomas C. Lee
*Assistant Examiner*—Rehana Perveen
*Attorney, Agent, or Firm*—Sawyer & Associates

[57] ABSTRACT

Method and system aspects control access through a synchronization primitive to a peripheral device in a processing system. A processing system in accordance with the present invention includes at least one central processing unit (CPU), and at least one peripheral device coupled to the at least one CPU, where the at least one peripheral device includes a synchronization primitive for controlling acquisition by at least one thread of execution from the at least one CPU. In a system aspect for controlling access, the system includes a circuit for sending a first signal from a component of the processing system to a synchronization primitive within the peripheral device to determine a state of the synchronization primitive, and acquiring control of the peripheral device when the synchronization primitive is in a released state. In a method for gaining control of a peripheral device in a processing system, the method includes sending a first signal from a component of the processing system to a semaphore register within the peripheral device to determine a bit pattern in the semaphore register, and acquiring control of the peripheral device when the semaphore register stores a first bit pattern.

30 Claims, 4 Drawing Sheets

FLIP FLOP STATES:
1=RELEASED
0=ACQUIRED

SYSTEM FOR ACCESSING CONTROL TO A PERIPHERAL DEVICE UTILIZING A SYNCHRONIZATION PRIMITIVE WITHIN THE PERIPHERAL DEVICE

FIELD OF THE INVENTION

The present invention relates to synchronization primitives, and more particularly to use of synchronization primitives with input/output peripheral devices.

BACKGROUND OF THE INVENTION

In typical computer systems, several control operations occur concurrently. Many of these control operations, or threads of execution, require the development of a specific set of uninterrupted steps in order to achieve a desired state. Oftentimes, during such critical operations, one thread of execution will impair other threads from executing by inhibiting interrupts in a processor of the system. While this normally maintains proper operation in a single processor system, computer systems with more than a single processor require more careful control.

With multi-processor systems, inhibiting interrupts during a critical sequence in a single processor, such as while an input/output (I/O) device is being accessed, does not necessarily inhibit access to the device by all processors. A typical way of handling such situations is to use synchronization objects within the processing system and manipulate these objects through operating system API (application program interface) calls.

For example, semaphore objects have sometimes been used as synchronization objects. Typically, threads of execution must first make a call to the operating system to try and acquire the semaphore object and then the system either grants or denies ownership of the object to the threads. The operating system ensures that only one thread has ownership of the object at any one time, and only the thread with ownership can release that ownership. Thus, access to a peripheral I/O device would sometimes be associated with a semaphore object to ensure that two threads do not try to control the I/O device at the same time and interfere with each other. Although synchronization objects do ensure a lack of interference, their implementation through the operating system slows down the operation. For accesses to an I/O device that do not require a significant amount of time, the call to the operating system and a requisite execution of many instructions can take more time than access time itself. Such delays reduce overall operating performance. Further frustration exists due to the small number of times that two or more threads actually desire simultaneous control of and access to a device.

Additionally, attempts to employ relatively quick synchronization primitives provided by the CPU architecture do not fully alleviate the problem. These primitives are processor-specific instructions. Therefore, these primitives do not automatically and transparently translate to run with other types of processors, such as x86, PowerPC™, DEC Alpha, etc. Of course, specific operating system calls could be made to create the transparency, but the difficulties and reduction of performance from using such calls, as described above, makes such use prohibitive.

A need exists for a synchronization mechanism that maintains coherent operation in a processing system without reducing performance and that can be used transparently with various processors. The present invention addresses such a need.

SUMMARY OF THE INVENTION

The present invention provides method and system aspects to control access through a synchronization primitive to a peripheral device in a processing system. A processing system in accordance with the present invention includes at least one central processing unit (CPU), and at least one peripheral device coupled to the at least one CPU, where the at least one peripheral device includes a synchronization primitive for controlling acquisition by at least one thread of execution from the at least one CPU.

In one aspect, the synchronization primitive includes a semaphore register. In another aspect, the synchronization primitive includes an n-bit counter. The n-bit counter preferably counts to a value representative of a number of threads of execution capable of acquiring the peripheral device.

In a system aspect for controlling access, the system includes a circuit for sending a first signal from a component of the processing system to a synchronization primitive within the peripheral device to determine a state of the synchronization primitive, and acquiring control of the peripheral device when the synchronization primitive is in a released state.

In a method for gaining control of a peripheral device in a processing system, the method includes sending a first signal from a component of the processing system to a semaphore register within the peripheral device to determine a bit pattern in the semaphore register, and acquiring control of the peripheral device when the semaphore register stores a first bit pattern. The method further includes changing the first bit pattern to a second bit pattern once control of the peripheral device is acquired, and releasing control of the peripheral device by sending a second signal to the semaphore register. The method also includes denying control of the peripheral device when the semaphore register stores a second bit pattern.

With the present invention, a synchronization mechanism is provided that maintains coherent operation in a processing system without reducing performance and that can be used transparently with various processors. Accordingly, system operation processing and speed are improved. Further, the use of a synchronization mechanism in a peripheral device in accordance with the present invention increases flexibility by providing functionality without processor-specific dependencies. These and other advantages of the aspects of the present invention will be more fully understood in conjunction with the following detailed description and accompanying drawings.

DETAILED DESCRIPTION

The present invention relates to improving the control of access to peripheral devices in both single and multi-processor systems. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
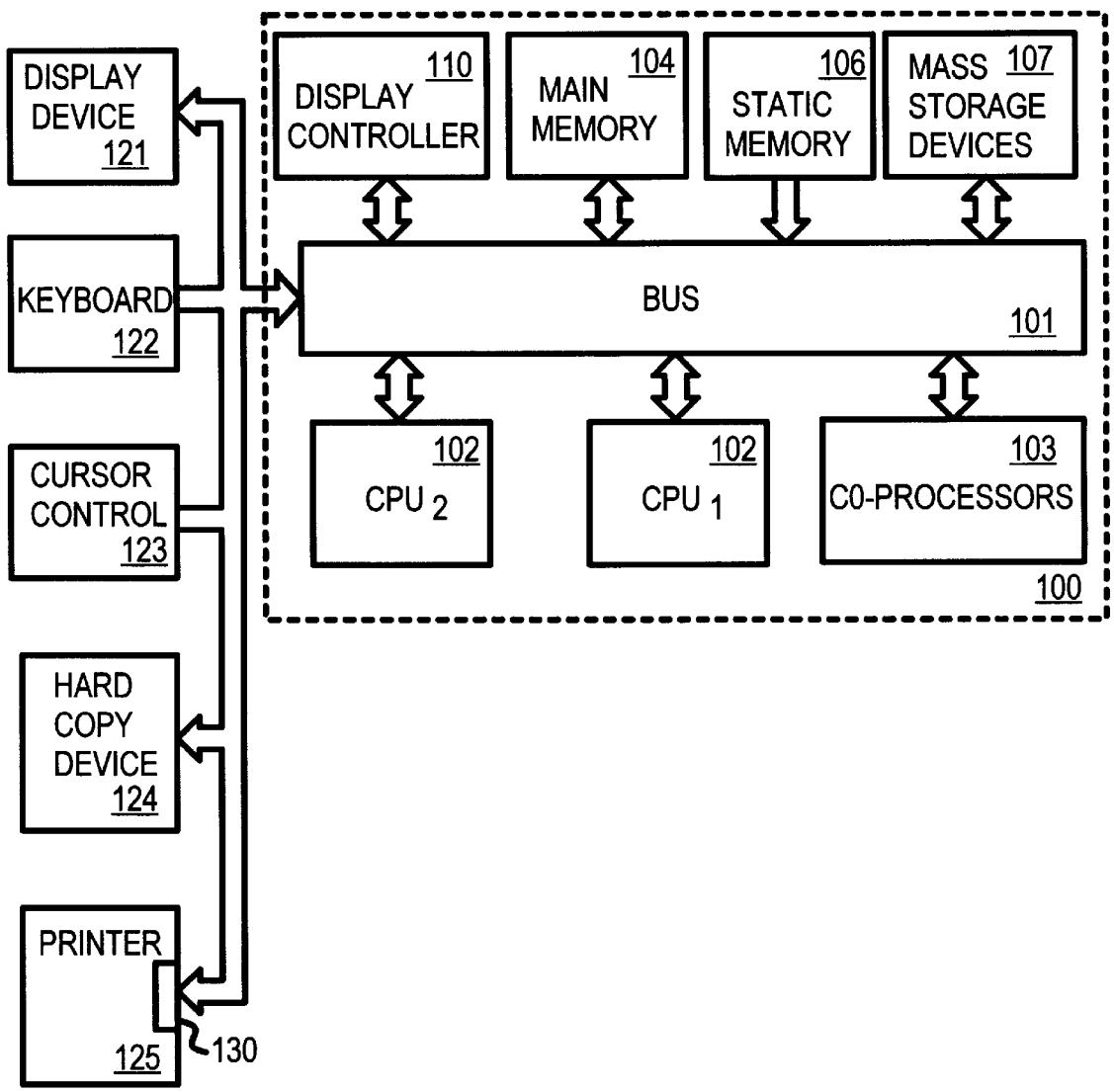
FIG. 1 illustrates a block diagram of a processing system that includes a synchronization primitive within a peripheral device in accordance with the present invention.

Referring to FIG. 1, a computer system 100 suitable for the present invention includes a bus 101 for internal transmission of digital data. Of course, bus 101 is preferably atomic, i.e., only one transaction can occur on the bus at one time. At least one central processing unit (CPU) 102 is coupled to bus 101 and processes digital data information. A plurality of co-processors 103 are also optionally coupled to the bus 101 for additional processing power and speed.

Random access memory (RAM) or main memory 104 is also coupled to bus 101. Main memory 104 suitably stores information and instructions executed by CPU 102. Main memory 104 further stores temporary variables and other intermediate information during execution of instructions by CPU 102, as is well appreciated by those skilled in the art. Read only memory (ROM) or other form of static storage device 106 is also included and coupled to bus 101. ROM 106 preferably stores static information and instructions for CPU 102. Other storage devices 107, such as a hard disk drive, a floppy disk drive, etc., are also suitably included for storing information and instructions and are coupled to bus 101.

Further included in computer system 100 is a display controller 110. Display controller 110 interfaces computer system 100 to a display device 121, such as a cathode ray tube (CRT). The display device 121 suitably displays information to computer user. Further included for a user are an alphanumeric input device 122, such as a keyboard, and cursor control device 123, such as a mouse, joystick, trackball or touch pad, etc. Use of cursor control device 123 allows movement and selection of objects or data visible on the display device 121.

By way of example, in accordance with the present invention, a synchronization primitive 130 is included in a peripheral device, such as a printer 125. In a preferred embodiment, synchronization primitive 130 is suitably provided by a semaphore register within the peripheral. Synchronization primitives preferably refer to basic types of synchronization mechanisms from which other types of more complex synchronization calls/objects are built with a semaphore register typically recognized as one of the most primitive synchronization mechanisms. System operation in conjunction with the synchronization primitive 130 is described with reference to the FIGS. 2a and 2b.

Figure 2A:
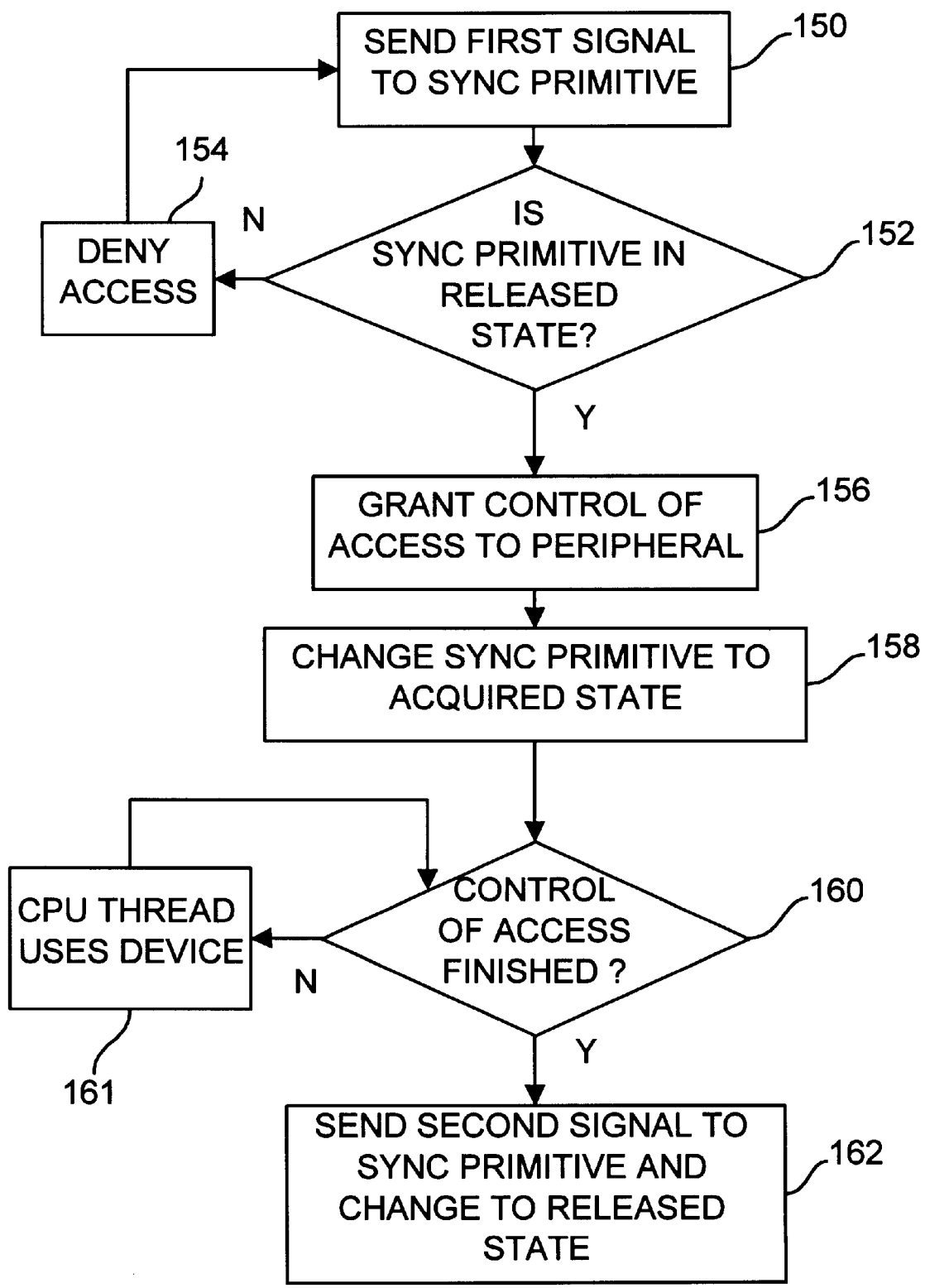
FIGS. 2a and 2b present a block flow diagram and state diagram, respectively, of the utilization of a synchronization primitive in accordance with a preferred embodiment of the present invention.
Figures 2B, 5:
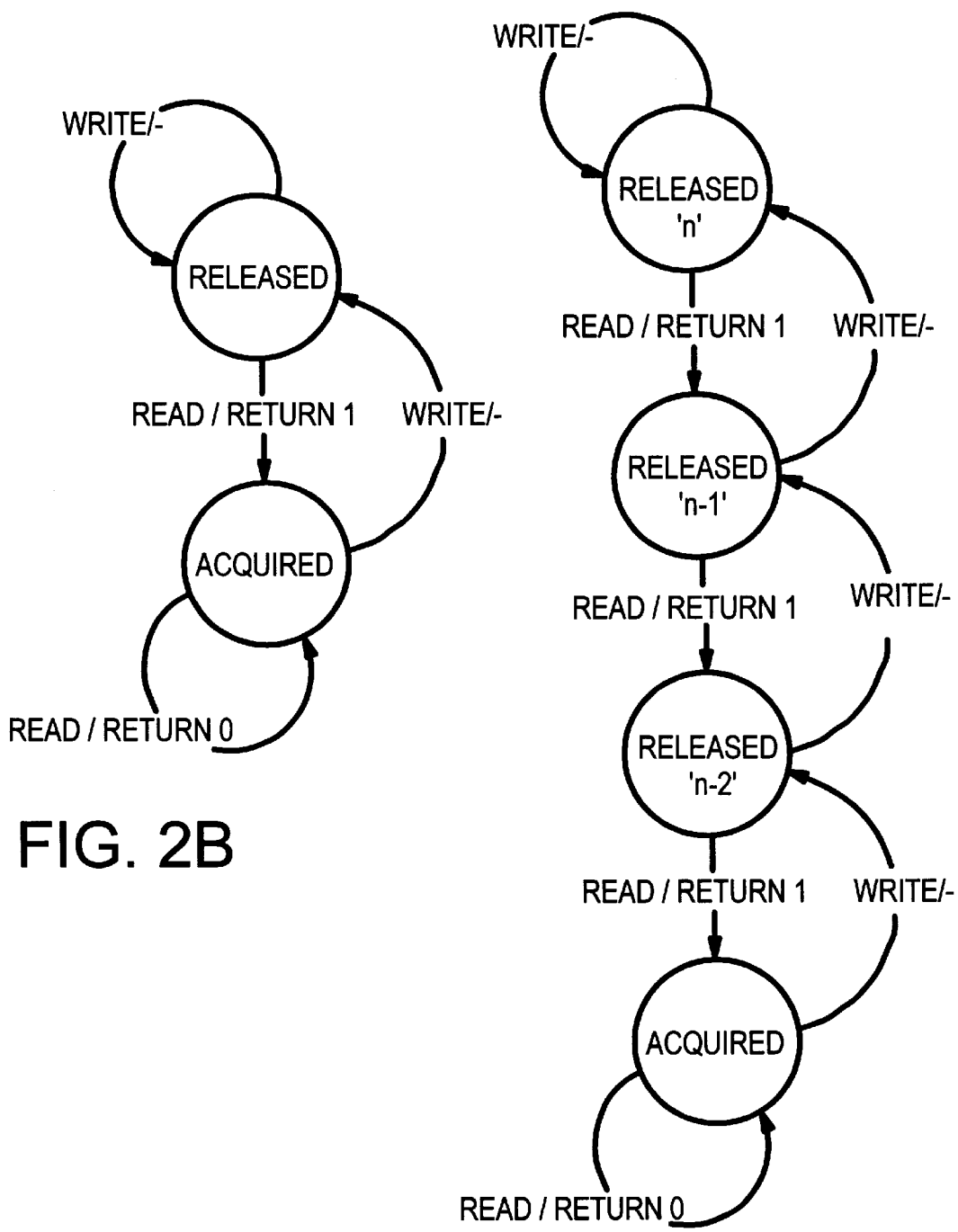
FIG. 5 illustrates a state diagram of operation for the synchronization primitive of FIG. 4.

FIGS. 2a and 2b present a block flow diagram and state diagram, respectively, of the utilization of the synchronization primitive 130 in accordance with a preferred embodiment of the present invention. As shown in FIG. 2a, utilization of the synchronization primitive 130 begins with an attempt by a system component, such as CPU 102, to gain control of the primitive 130 by sending a first signal to the synchronization primitive 130, via step 150. By way of example, when the synchronization primitive 130 is a semaphore register, sending an active-low read signal suitably acts as the first signal.

In response to the first signal, preferably the synchronization primitive 130 returns an indication of its state, i.e., whether it is in an acquired or released state, via step 152. In the semaphore register embodiment, preferably a bit pattern stored in the register indicates the register's state. For example, a bit pattern of a bit at a high logic level suitably indicates a released state in the register, while a bit pattern of a bit at a low logic level suitably indicates an acquired state in the register. Of course, other bit patterns and number of bits used to form the bit pattern are suitable and within the scope of the present invention.

When in an acquired state, access of control to the peripheral device is denied, via step 154. When in a released state, control of the peripheral device is granted to the requesting system component, via step 156. Once acquired, the synchronization primitive 130 transitions to an acquired state, e.g., the bit pattern in the semaphore register changes from a high bit to a low bit, via step 158. While the system component has control of the peripheral device, as determined via step 160, the synchronization primitive remains in an acquired state, and the thread of execution utilizes the peripheral, via step 161. Thus, other system components attempting to acquire the primitive, keep sending read signals, i.e., they spin-on reading, until the primitive reaches a released state.

Once the system component has completed its use of the peripheral device, the system component sends a second signal to the synchronization primitive 130 to transition the state of the synchronization primitive 130 to a released state, via step 162. In the embodiment of a semaphore register, an active-low write signal suitably acts as the second signal to transition the bit pattern of the semaphore register to a released state, e.g., to a high bit. It should be appreciated that although particular logic levels are associated with particular signals, these are meant to be illustrative and not restrictive of the present invention. Thus, active-high signals are also suitable for implementation, as is well appreciated by those skilled in the art.

FIG. 2b illustrates the flow diagram of FIG. 2a in a state diagram form. As shown, when a first signal, such as a read signal is received, the semaphore register returns a value indicative of its released state, e.g., a high bit value. Once the read signal is received, the state changes to an acquired state and the value in the register changes accordingly, e.g., to a low bit value. Attempts by other system components to gain access to the register once in the register is in the acquired state, e.g., by sending a read signal, are denied, and the register remains in the acquired state. When a second signal, e.g., the write signal, is received by the register in the acquired state, the register returns to a released state. Other receipts of second signals are suitably ignored.

Figure 3:
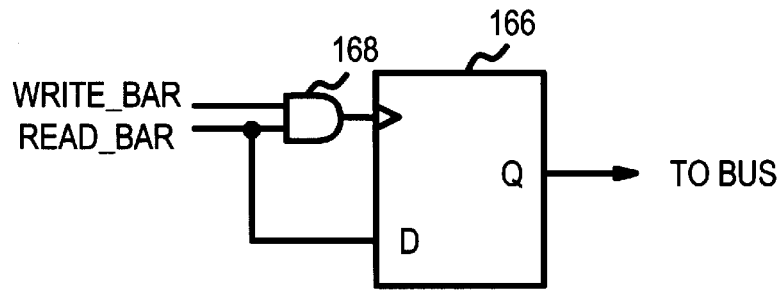
FIG. 3 illustrates a D flip-flop suitable for use as a synchronization primitive and implemented in accordance with the state diagram of FIG. 2b.

FIG. 3 illustrates a D flip-flop 166 suitable for use as a semaphore register or synchronization primitive 130 and implemented in accordance with the state diagram of FIG. 2b. As illustrated in FIG. 3, the flip-flop 166 receives an active-low first signal, read_bar, at its D input and a signal resultant of the "ANDing" of the read_bar signal and an active-low second signal, write_bar, at its clock input, via an AND gate 168. Preferably, the data value on the bus is latched when the strobe goes high at the end of the cycle with clocking occurring on the rising edge of the clock.

Figure 4:
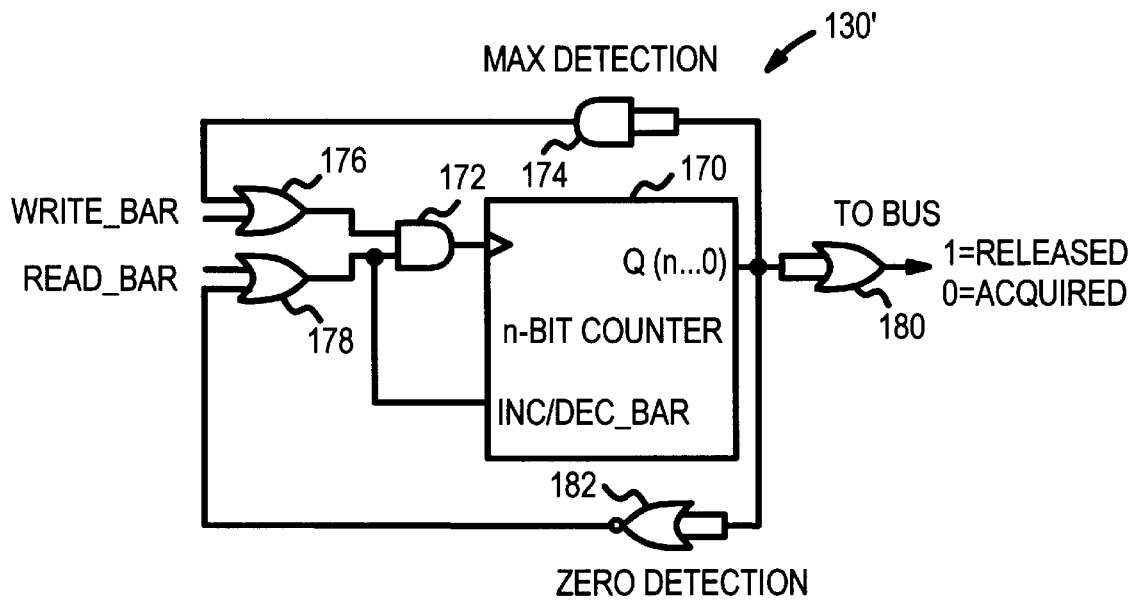
FIG. 4 illustrates an alternate synchronization primitive suitable for handling more than one access to a peripheral.

In an alternate preferred embodiment of the present invention, a synchronization primitive is utilized to allow more than a single thread to acquire a peripheral. FIG. 4 illustrates an alternate synchronization primitive 130' suitable for handling more than one access to a peripheral. Preferably, an n-bit counter 170 is utilized to implement synchronization primitive 130'. To more particularly describe the operation of synchronization primitive 130', FIG. 5 illustrates a state diagram of operation.

The synchronization primitive 130' preferably begins in a released state where the counter 170 is at a maximum value "n". The maximum value "n" is preferably chosen as desired and according to system requirements for the number of threads capable of simultaneously accessing a peripheral, as is well appreciated by those skilled in the art. When a request for acquisition is made via a first signal by a first device, such as an active-low read signal, the primitive 130' is acquired. Accordingly, the number of threads capable of acquiring the primitive 130' is suitably reduced by one to a value of "n–1".

When the first device still has access and a second device requests access, e.g., via the read signal, the second device is allowed access and the counter is again suitably reduced by one to a value of "n–2". When the value of the counter has been reduced to zero, i.e., the maximum number of threads "n" has been reached, the next request for access is denied by the primitive 130'. As each one of the devices having acquired the primitive 130' releases control via a second signal, e.g., an active-low write signal, the state of the synchronization primitive 130' returns to a released state, and the counter value is increased by one.

Referring again to FIG. 4, a suitable circuit for implementing the state diagram of FIG. 5 includes AND gates 172 and 174, OR gates 176, 178, and 180, and NOR gate 182. The output of the counter 170 is input to the AND gate 174 to detect when the counter is at its maximum "n" value. The NOR gate 182 is also coupled to the counter output 170 to detect when the counter has reached its zero value. The output of the AND gate 174 is coupled to one input of OR gate 176. OR gate 176 also receives the second signal, e.g., a write_bar signal. The OR gate 178 receives the first signal, e.g., a read_bar signal, on one input and the output of NOR gate 182 at a second input. The outputs of OR gates 176 and 178 are input to AND gate 172. The output of AND gate 172 is coupled to the clock input of counter 170. The output of OR gate 178 is further coupled to the increment/decrement_bar input of the counter 170. The output of counter 170 is coupled through the OR gate 180 to the system bus (101, FIG. 1).

Preferably, the first and second signals are active-low bus strobes, and the data value on the bus is latched when the strobe goes high at the end of the cycle with clocking occurring on the rising edge of the clock.

It should be appreciated that although the counter has been described with reference to counting a maximum value down by one, other implementations are possible. Such implementations include counting a value upwards and counting in either direction by a desired value, such as by one's, two's, or two's complement. Further, the value for the "acquired" state could be specialized to a specific desired value for more particularly controlling access to the primitive 130', as is well appreciated by those skilled in the art.

With the present invention, a synchronization primitive is provided within a peripheral to more easily and quickly control acquisition of the peripheral. Operation performance is improved since time is not wasted making operating system calls. Further, with the synchronization primitive provided within the peripheral, there is no limitation on use with only a specific type of processor. Additionally, the present invention works efficiently and straightforwardly in multi-processing environments.

Although the present invention has been described in accordance with the embodiments shown, one of ordinary skill in the art will recognize that there could be variations to the embodiment and those variations would be within the spirit and scope of the present invention.

For example, the synchronization primitive as described herein could be used to build up more complex synchronization objects, such as to control access to a counter in memory, as is well appreciated by those skilled in the art. Further, although the register implementation has been described with reference to a single flip-flop, it could, of course, be mapped into a byte-wide, 32-bit wide, etc., register in the peripheral.

Accordingly, many modifications may be made by one of ordinary skill without departing from the spirit and scope of the present invention, the scope of which is defined by the following claims.

What is claimed is:

1. A computer processing system, the system comprising:
    at least one central processing unit (CPU); and
    at least one peripheral device coupled to the at least one CPU, the at least one peripheral device including a synchronization primitive within the at least one peripheral device for controlling acquisition by at least one thread of execution from the at least one CPU.

2. The system of claim 1 wherein the synchronization primitive comprises a semaphore register.

3. The system of claim 2 wherein the semaphore register comprises at least one D flip-flop.

4. The system of claim 1 wherein the synchronization primitive comprises an n-bit counter.

5. The system of claim 4 wherein the n-bit counter counts to a value representative of a number of threads of execution capable of acquiring the at least one peripheral device.

6. The system of claim 5 wherein the n-bit counter counts up by ones.

7. The system of claim 5 wherein the n-bit counter counts up by twos.

8. The system of claim 5 wherein the n-bit counter counts up by two's complement.

9. The system of claim 5 wherein the n-bit counter counts down by ones.

10. The system of claim 5 wherein the n-bit counter counts down by twos.

11. The system of claim 5 wherein the n-bit counter counts down by two's complement.

12. A system for controlling access of a peripheral device in a processing system, the system comprising:
    a circuit for:
        (a) sending a first signal from a component of the processing system to a synchronization primitive within the peripheral device to determine a state of the synchronization primitive; and
        (b) acquiring control of the peripheral device when the synchronization primitive is in a released state.

13. The system of claim 12 wherein the synchronization primitive comprises a semaphore register.

14. The system of claim 13 wherein the semaphore register comprises a D flip-flop.

15. The system of claim 12 wherein the synchronization primitive comprises an n-bit counter.

16. The system of claim 15 wherein the n-bit counter allows a predetermined number of accesses to the peripheral device.

17. A method for gaining control of a peripheral device in a processing system, the method comprising:
    (a) sending a first signal from a component of the processing system to a semaphore register within the peripheral device to determine a bit pattern in the semaphore register; and
    (b) acquiring control of the peripheral device when the semaphore register stores a first bit pattern.

18. The method of claim 17 further comprising changing the first bit pattern to a second bit pattern once control of the peripheral device is acquired.

19. The method of claim 17 further comprising denying control of the peripheral device when the semaphore register stores a second bit pattern.

20. The method of claim 17 further comprising releasing control of the peripheral device by sending a second signal to the semaphore register.

21. The method of claim 20 wherein the second signal causes the semaphore register to store the first bit pattern.

22. The method of claim 17 wherein the first signal comprises an active-low read signal.

23. The method of claim 17 wherein the first bit pattern comprises at least one bit at a high logic level.

24. The method of claim 20 wherein the second signal comprises an active-low write signal.

25. The method of claim 18 wherein the second bit pattern comprises at least one bit at a low logic level.

26. The method of claim 17 wherein the first signal comprises an active-high read signal.

27. The method of claim 17 wherein the first bit pattern comprises at least one bit at a low logic level.

28. The method of claim 20 wherein the second signal comprises an active-high write signal.

29. The method of claim 18 wherein the second bit pattern comprises at least one bit at a high logic level.

30. The system of claim 1 wherein the synchronization primitive controls acquisition independently of processor-specific synchronization primitive functions of the at least one CPU.

* * * * *